(12) United States Patent
de Azevedo Araujo et al.

(10) Patent No.: US 12,098,631 B2
(45) Date of Patent: Sep. 24, 2024

(54) PROCESS-MINING SOFTWARE FOR GENERATING A PROCESS FLOW FOR FORMING A WELLBORE

(71) Applicant: Landmark Graphics Corporation, Houston, TX (US)

(72) Inventors: Henrique de Azevedo Araujo, Rio de Janeiro (BR); Paulo Alves Braz, Rio de Janeiro (BR); Marcelo Gomes de Souza, Rio de Janeiro (BR)

(73) Assignee: Landmark Graphics Corporation, Houston, TX (US)

( * ) Notice: Subject to any disclaimer, the term of this patent is extended or adjusted under 35 U.S.C. 154(b) by 825 days.

(21) Appl. No.: 17/238,938

(22) Filed: Apr. 23, 2021

(65) Prior Publication Data

US 2022/0341315 A1   Oct. 27, 2022

(51) Int. Cl.
| | |
|---|---|
| *G06N 20/00* | (2019.01) |
| *E21B 44/00* | (2006.01) |
| *E21B 47/09* | (2012.01) |
| *E21B 47/12* | (2012.01) |
| *E21B 47/26* | (2012.01) |
| *E21B 49/00* | (2006.01) |

(52) U.S. Cl.
CPC .............. *E21B 47/12* (2013.01); *E21B 44/00* (2013.01); *E21B 47/09* (2013.01); *E21B 47/26* (2020.05); *E21B 49/003* (2013.01); *G06N 20/00* (2019.01)

(58) Field of Classification Search
CPC .......... E21B 47/12; E21B 44/00; E21B 47/09; E21B 47/26; E21B 49/003; E21B 43/12; G06N 20/00; G06N 7/01; G06N 3/008
See application file for complete search history.

(56) References Cited

U.S. PATENT DOCUMENTS

| | | |
|---|---|---|
| 2015/0081222 A1 | 3/2015 | Laing et al. |
| 2016/0223704 A1 | 8/2016 | Donderici et al. |
| 2020/0182038 A1 | 6/2020 | Soukup et al. |

(Continued)

FOREIGN PATENT DOCUMENTS

| | | | | |
|---|---|---|---|---|
| CA | 2957434 C | * | 5/2022 | ............. E21B 44/00 |
| GB | 2593019 A | * | 9/2021 | ............. E21B 47/12 |
| WO | WO-2008150811 A1 | * | 12/2008 | ............. E21B 37/06 |

(Continued)

OTHER PUBLICATIONS

"Process Mining", available at http://www.processmining.org/, 2016, 2 pages.

(Continued)

*Primary Examiner* — Hassan Mrabi
(74) *Attorney, Agent, or Firm* — Kilpatrick Townsend & Stockton LLP

(57) ABSTRACT

Process-mining software is disclosed for generating a process flow for forming a wellbore at a wellsite. The process-mining software can receive data from sensors at a wellsite. The process-mining software can determine wellbore operations performed at the wellsite, based on the received data, using a predefined algorithm. The process-mining software can generate an event log based on the determined wellbore operations. The process-mining software can then generate a process flow based on the event log. The process-mining software can output the process flow for use in forming one or more wellbores.

20 Claims, 7 Drawing Sheets

(56) References Cited

U.S. PATENT DOCUMENTS

2022/0196876 A1\* 6/2022 Wrobel-Daveau ..... G01V 1/301

FOREIGN PATENT DOCUMENTS

| WO | 2014066981 | 5/2014 |
| WO | 2021040774 | 3/2021 |

OTHER PUBLICATIONS apromore.org, "Process Mining 101", available at https://apromore.org/process-mining/ at least as early as Mar. 2, 2021, 9 pages.
celonis.com, "Execution Management System—What is Process Mining?", available at https://www.celonis.com/process-mining/what-is-process-mining/ at least as early as Mar. 2, 2021, 7 pages.
PCT Application No. PCT/US2021/029066, International Search Report and Written Opinion, Mailed On Jan. 7, 2022, 8 pages.

\* cited by examiner

PROCESS-MINING SOFTWARE FOR GENERATING A PROCESS FLOW FOR FORMING A WELLBORE

TECHNICAL FIELD

The present disclosure relates generally to wellbore operations and, more particularly (although not necessarily exclusively), to process-mining software configured to generate a process flow for forming a wellbore.

BACKGROUND

A wellbore can be formed in a subterranean formation for extracting hydrocarbon material from the subterranean formation. The wellbore can be formed in a sequence of operations. Well operators or other individuals may report their understanding of the sequence operations, but because the operations can be performed belowground or in other locations that are not viewable by the individuals, the reported operations may not represent actual operations performed to create the wellbore. Additionally, the sequence of operations actually performed may be suboptimal and may deviate from a predefined well process. Differences between the expected operations and the actual operations performed to create the wellbore may make it challenging to identify problems impacting wellbore operations.

DETAILED DESCRIPTION

Figure 1:
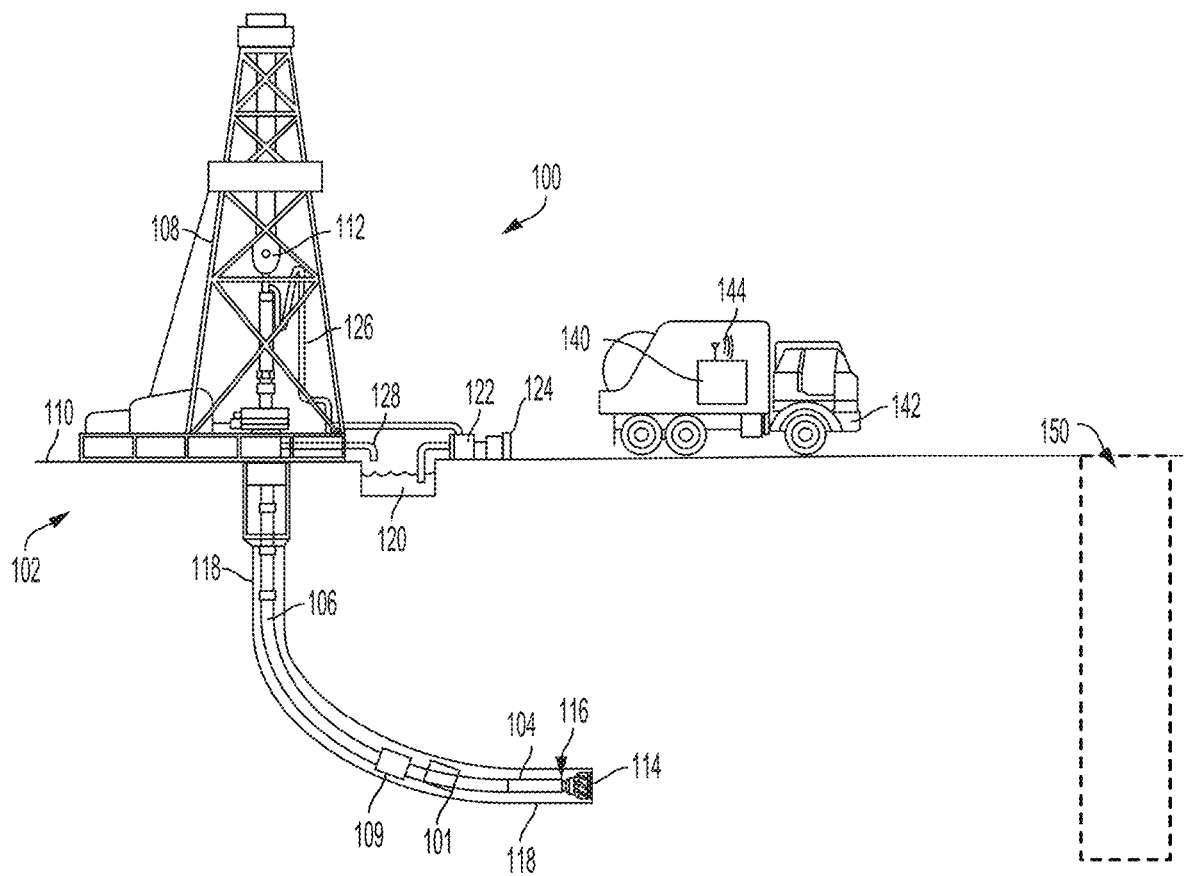
FIG. 1 shows a cross-sectional view of a wellbore with a computing system usable to execute process-mining software to generate a process flow according to some examples of the present disclosure.

Certain aspects and examples of the present disclosure relate to a computing device that can execute process-mining software configured to generate and output a process flow for forming a wellbore at a target wellsite. Process-mining can involve deriving a process flow (e.g., a sequence of operations) from event logs indicating previously performed operations. The process-mining software can include one or more machine-learning models that are trained based on historical data about existing wells. The computing device can execute the process-mining software to analyze event logs from one or more preexisting wellsites to discover insights about actual operations performed at the wellsites, so that the machine-learning models can generate a process flow based on the discovered insights. The process flow can include a sequential list or collection of wellbore operations to be performed with respect to the target wellsite. Examples of the wellbore operations can include drilling, tripping in, circulating, etc. Once generated, the process flow can be used to create a wellbore at the target wellsite. The process-mining software can be applied to determine a process flow for any suitable stage or stages associated with forming a wellbore, such as subsurface exploration, well construction, and well production.

In some examples, the computing device can generate at least a portion of the event log by identifying one or more wellbore operations performed at one or more wellsites (e.g., the target wellsite and/or a different wellsite) and including them in the event log. For example, the computing device can identify the wellbore operations based on sensor data, such as real-time sensor data from one or more sensors located at the wellsites. To do so, the computing device can apply one or more predefined algorithms to the sensor data to determine one or more wellbore operations performed at the one or more wellsites. The algorithms can include a rules-based algorithm, a machine-learning algorithm, or both of these for determining the wellbore operations. The sensor data can serve as evidence of actual operations performed at the wellsite that can produce a more accurate event log. The computing device can then include the identified wellbore operations in the event log. The event log can additionally or alternatively include wellbore operations that are observed and reported by operators of the one or more wellsites.

In some examples, the process flow can also be compared against a baseline well process or actual well operations at the target wellsite to identify deviations there-between and notify a well operator of the deviations. The deviations may lead to suboptimal creation of the wellbore at the target wellsite. For example, the deviations may indicate bottlenecks, excessive time sinks, unnecessary steps, or non-compliant wellbore operations that may be unsafe or may be otherwise undesirable. The deviations can be identified by one or more predefined algorithms, such as a machine-learning model. The predefined algorithms can compare actual operations at a target wellsite to the process flow to identify deviations that can be remedied (if the deviations are negative) or that can used to improve the process flow (if the deviations are positive). Continuous improvement can be applied to the process flow, to the process-mining software, or to a combination thereof.

In some examples, the process-mining software may also help improve the efficiency of wellbore operations. During a lifecycle of a well, the actual behavior of the well or the actual operations performed at the well can be used to optimize, or further improve, subsequent operations performed during the lifecycle. An entity operating or servicing a wellbore may wish to understand, measure, and determine actual operations that occurred or are occurring at a wellsite. Although data about the wellbore is sometimes provided to operators thereof, the operators have historically been tasked with manually interpreting the data to determine the operations performed at the wellsite. These manual techniques are often slow, erroneous, and costly, and may lead to the suboptimal understanding of the actual process flow at the wellsite. This may lead to suboptimal processes at the same wellsite or other wellsites. But the process-mining software can automatically analyze event logs to generate a process flow indicating operations previously performed at the wellsite. The process flow derived by the process-mining software may allow operators or other entities associated with the wellsite to better understand well operations at the wellsite beyond reported or human-interpreted data.

In some examples, the process-mining software can be part of a well design program configured to design a process flow for constructing a target well. The well design program can use time summary data and real-time data from wells to determine an event log for generating the process flow. The well design program can use historical data from prior wells to generate the process flow. The process flow can include a sequence of well operations to be performed at a target wellsite, where the sequence of well operations can be determined automatically by the process-mining software. The well design program can then display the determined sequence of operations for viewing by an operator associated with the target wellsite.

In some examples, the well design program can create an event log based on the historical data and can execute process-mining software with respect to the event log to discover a process flow indicated by the event log. The process flow can indicate one or more operations to perform at the target wellsite. The well design program can then perform a variance analysis and a performance check with respect to the process flow, for example by comparing actual well operations at the target wellsite to the process flow. The variance analysis can be executed by the computing device for determining whether a deviation exists between actual wellbore operations and expected wellbore operations. And, the performance check can be executed by the computing device for determining whether the identified deviation improves the process flow. Based on the variance analysis, and/or the performance check, the well design program can revise the process flow.

In some examples, the well design program can transmit the process flow to a well execution program configured to implement the process flow with respect to a target wellsite. The well execution program, and any associated applications, can access the process flow and can monitor the wellbore operations. A real-time operations classifier, which can be included in the well execution program, can identify wellbore operations being performed at the target wellsite. Additionally or alternatively, the well execution program can compare real-time, actual wellbore operations being performed at the target wellsite against the process flow to identify and remedy deviations.

In some examples, the well execution program can transmit identified deviations and associated data to the well design program for use by the well design program to improve the process flow. The improvements can include engineering simulations, an updated process flow, and the like. The well design program can then transmit the updated process flow, the engineering simulations, etc., to the well execution program for forming the well.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional view of a well system 100 including a wellbore 118 according to some examples of the present disclosure. The well system 100 can be a wellsite at which the wellbore 118 is formed. In some examples, the well system 100 can be a historical or otherwise preexisting well system. The wellbore 118 can be used to extract hydrocarbons from a subterranean formation 102. The wellbore 118 can be drilled using a drilling system. The drilling system may drive a bottom hole assembly (BHA) 104 positioned or otherwise arranged at the bottom of a drill-string 106 extended into the subterranean formation 102 from a derrick 108 arranged at the surface 110. The derrick 108 can include a kelly 112 used to lower and raise the drill-string 106.

The BHA 104 may include a drill bit 114 operatively coupled to a tool string 116, which may be moved axially within a drilled wellbore 118 as attached to the drill-string 106. The tool string 116 may include one or more sensors 109 for determining conditions in the wellbore 118. The sensors 109 may be part of a measurement unit that may be deployable downhole in the wellbore 118 and may sense data relating to drilling conditions or any other suitable downhole data. The sensors 109 can include a weight-on-bit sensor, a revolutions-per-minute sensor, a pressure sensor, temperature sensor, or other suitable sensor for detecting data about wellbore operations for forming the wellbore 118. In some examples, the sensors 109 can be disposed downhole in the wellbore 118, at the surface 110, a combination thereof, or in any other suitable location for detecting data relating to forming the wellbore 118. Sensors 109 that are positioned at the surface 110 can convey detected data usable for generating event logs of the actual wellbore operations for forming the wellbore 118. The measurement unit can transmit data relating to the drilling conditions to a computing device 140 that can be positioned at the surface 110 or in other suitable locations. The combination of any support structure (in this example, the derrick 108), any motors, electrical equipment, and support for the drill-string and tool string may be referred to herein as a drilling arrangement.

During operation, the drill bit 114 penetrates the subterranean formation 102 to create the wellbore 118. The BHA 104 can control the drill bit 114 as the drill bit 114 advances into the subterranean formation 102. The combination of the BHA 104 and the drill bit 114 can be referred to as a drilling tool. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill-string 106 and conveys the mud to the drill bit 114. The mud exits one or more nozzles (not shown) arranged in the drill bit 114 and thereby cools the drill bit 114. After exiting the drill bit 114, the mud circulates back to the surface 110 via the annulus defined between the wellbore 118 and the drill-string 106, thereby carrying the drill cuttings and debris to the surface. The cuttings and mud mixture are passed through a flow line 128 and are processed such that a cleaned mud is returned down hole through the stand pipe 126 once again.

The computing device 140 can be positioned belowground, aboveground, onsite, in a vehicle 142, offsite, etc. As shown in FIG. 1, the computing device 140 is positioned on the vehicle 142 at the surface 110. The computing device 140 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 140. In some aspects, the computing device 140 can include input/output interface components (e.g., a display, printer, keyboard, touch-sensitive surface, and mouse) and additional storage. The computing device 140 can be communicatively coupled to the sensors 109. In some examples, the computing device 140 can be wirelessly connected to the sensors 109 for receiving data about downhole conditions. In other examples, the computing device 140 can be communicatively coupled to the sensor via a wired connection.

The computing device 140 can include a communication device 144. The communication device 144 can represent one or more of any components that facilitate a network connection. In the example shown in FIG. 1, the communication devices 144 are wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 144 can use acoustic waves, surface waves, vibrations, optical waves, or induction (e.g., magnetic induction) for engaging in wireless communications. In other examples, the communication device 144 can be wired and can include interfaces such as Ethernet, USB, IEEE 1394, or a fiber optic interface. In an example with at least one other computing device, the computing device 140 can receive wired or wireless communications from the other computing device and perform one or more tasks based on the communications.

The computing device 140 may be configured to perform various tasks associated with generating and outputting a process flow. For example, the computing device 140 can generate an event log of observed or recorded wellbore operations associated with forming the wellbore 118. In some examples, the computing device 140 can include one or more predefined algorithms for determining the wellbore operations to include in the event log based on sensor data. The computing device 140 can then determine the process flow based on the event log. In some examples, the computing device 140 can execute a trained machine-learning model to generate the process flow. The computing device 140 can output the process flow for use in forming a subsequent wellbore, such as a wellbore at a target wellsite 150 that may or may not be positioned proximate to the well system 100.

Figure 2:
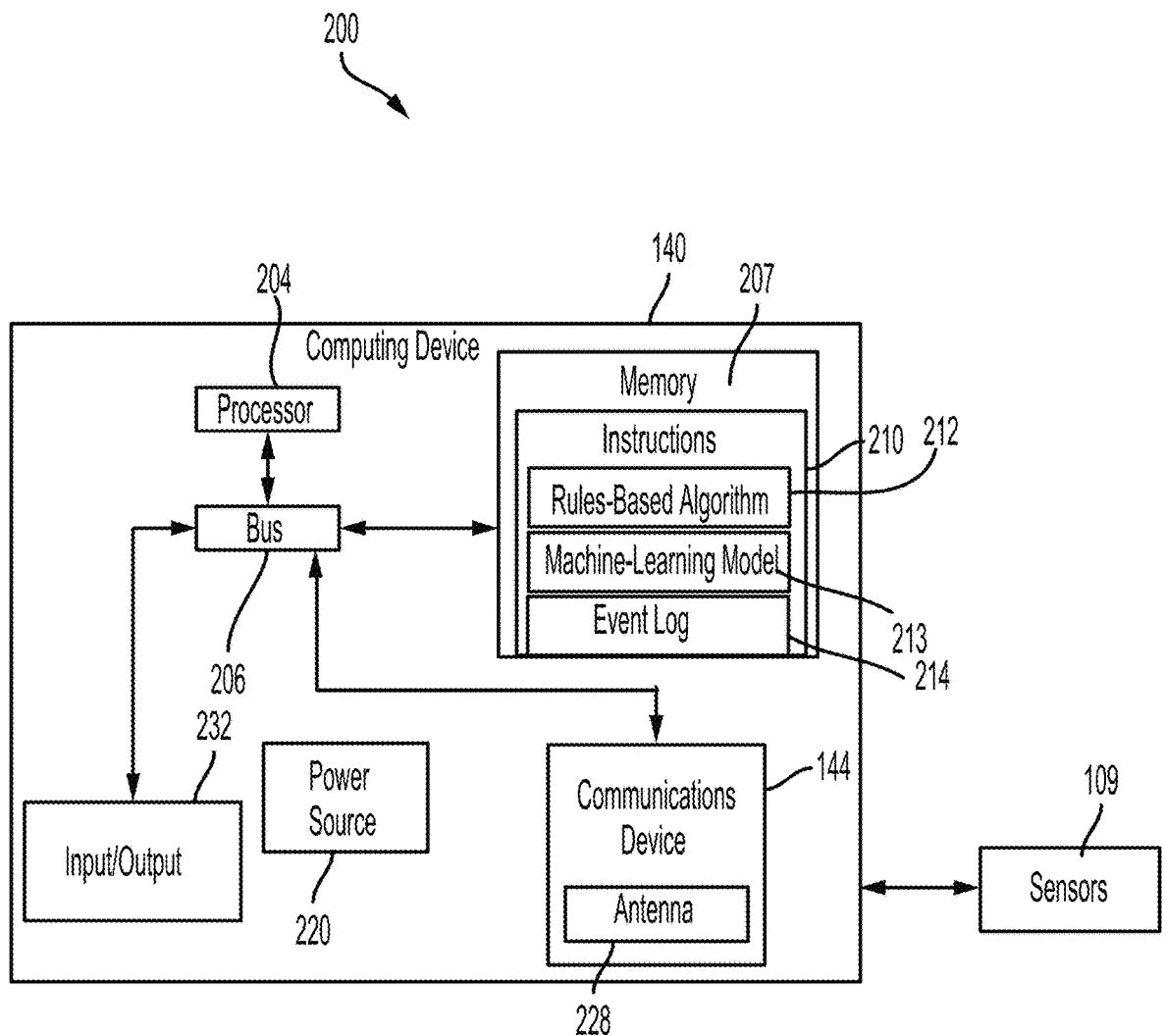
FIG. 2 shows a block diagram of a computing system for executing process-mining software to generate a process flow according to some examples of the present disclosure.

FIG. 2 is a block diagram of a system 200 for generating and outputting a process flow for forming a wellbore according to some examples of the present disclosure. The components shown in FIG. 2, such as the processor 204, memory 207, power source 220, and communications device 144, may be integrated into a single structure, such as within a single housing of a computing device 140. Alternatively, the components shown in FIG. 2 can be distributed from one another and in electrical communication with each other.

The computing system 200 may include the computing device 140. The computing device 140 can include a processor 204, a memory 207, and a bus 206. The processor 204 can execute one or more operations for generating and outputting the process flow for forming a wellbore. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for generating and outputting the process flow based on an event log 214. For example, the instructions 210 can include a rules-based algorithm 212 that is executable by the processor 204 for causing the processor 204 to determine wellbore operations based on sensor data for automatically generating at least some of the event log 214. Additionally or alternatively, the instructions 210 can include one or more machine-learning models, collectively represented as machine-learning model 213, that can generate the event log 214 and/or a process flow based on the event log 214. The rules-based algorithm 212 and/or the machine-learning model 213 may form the process-mining software described herein.

The computing device 140 can include a power source 220. The power source 220 can be in electrical communication with the computing device 140 and the communications device 144. In some examples, the power source 220 can include a battery or an electrical cable (e.g., a wireline). The power source 220 can include an AC signal generator. The computing device 140 can operate the power source 220 to apply a transmission signal to the antenna 228 to generate electromagnetic waves that convey data relating to drilling parameters, the event log 214, the process flow, etc. to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, part of the communications device 144 can be implemented in software. For example, the communications device 144 can include additional instructions stored in memory 207 for controlling functions of the communication device 144. The communications device 144 can receive signals from remote devices and transmit data to remote devices. For example, the communications device 144 can transmit wireless communications that are modulated by data via the antenna 228. In some examples, the communications device 144 can receive signals (e.g. associated with data to be transmitted) from the processor 204 and amplify, filter, modulate, frequency shift, or otherwise manipulate the signals. In some examples, the communications device 144 can transmit the manipulated signals to the antenna 228. The antenna 228 can receive the manipulated signals and responsively generate wireless communications that carry the data.

The computing device 140 in this example additionally includes an input/output interface 232. The input/output interface 232 can connect to a keyboard, pointing device, display, and other computer input/output devices. An operator may provide input using the input/output interface 232. The process flow for forming the wellbore 118 can be displayed to an operator of a target wellsite through a display that is connected to or is part of the input/output interface 232. The displayed values can be observed by the operator, or by a supervisor of the target wellsite, who can make adjustments based on the displayed values.

Figure 3:
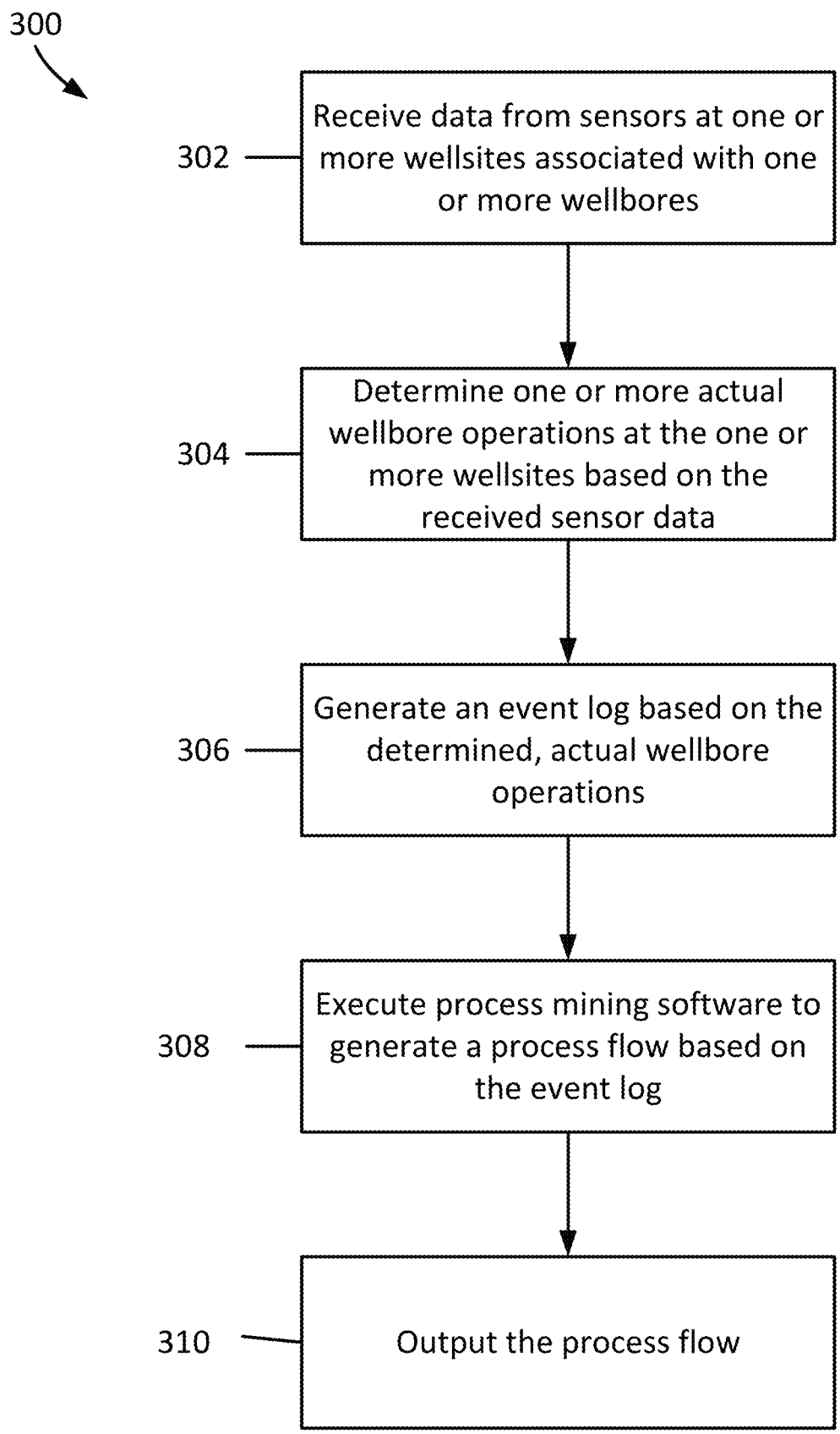
FIG. 3 shows a flow chart of a process to generate and output a process flow for forming a wellbore according to some examples of the present disclosure.

FIG. 3 is a flow chart of an example of a process 300 to generate and output a process flow for forming a wellbore at a target wellsite 150 according to some examples of the present disclosure. Other examples may involve more steps, fewer steps, different steps, or a different combination of steps than is shown in FIG. 3. The below steps are described with reference to the components of FIGS. 1-2 described above.

At block 302, the computing device 140 receives data from sensors at one or more wellsites associated with one or more wellbores. In some examples, the sensor 109 can be included in the sensors or can include the sensors. The sensors can detect and transmit data to the computing device 140 relating to drilling conditions, wellbore conditions, or other aspects of a wellsite. For example, the sensors can include a rate-of-penetration sensor, a revolutions-per-minute sensor, a weight-on-bit sensor, a pressure sensor, a temperature sensor, or other suitable sensor for detecting drilling conditions relating to the one or more wellbores. The sensors can additionally provide timestamps relating to the detected data. For examples, the sensors can indicate a start time, an end time, and other time-related information associated with the detected data. The computing device 140 can receive the data about the drilling conditions.

At block 304, the computing device 140 determines one or more actual wellbore operations performed at the one or more wellsites based on the sensor data. The computing device 140 can determine the actual wellbore operations based on the sensor data by using one or more predefined algorithms. The algorithms can include a rules-based algorithm 212, a machine-learning model 213, or a combination thereof to determine the actual wellbore operations based on the sensor data. For example, the machine-learning model 213 can include a classifier such as a Naive Bayes classifier for identifying wellbore operations based on the senor data. In some examples, the algorithms can classify actual wellbore operations based on one or more sensed conditions. For example, if the revolutions-per-minute sensor detects that the revolutions-per-minute is 2000, and the weight-on-bit sensor detects a weight-on-bit of 226.8 kilograms (kg), the algorithms can classify the actual wellbore operation as drilling. In some examples, the algorithms can provide timestamps indicating a beginning and of an end of each actual wellbore operation and a description of the actual wellbore operation associated with the timestamp. The algorithms 212 can include or provide other information for classifying the actual wellbore operations.

At block 306, the computing device 140 generates an event log 214 based on the determined, actual wellbore operations. The computing device 140 may incorporate the classified, actual wellbore operations into a single group or list that serves as the event log 214. Other information may also be included in the event log 214. For example, wellbore operations reported by well operators at the one or more wellsites can also be incorporated into the event log 214, so that the resulting event log 214 is partially automatically generated and partially manually generated. In some examples, the event log 214 may indicate the actual wellbore operations without a known or specified order.

At block 308, the computing device 140 executes process-mining software for generating a process flow based on the event log 214. The event log 214 can be used to derive or otherwise generate the process flow. The process-mining software can use the event log 214 as an input and output the process flow. The process flow can include a set of wellbore operations including insights, metadata or other context about the wellbore operations. The wellbore operations can be similar or identical to the actual wellbore operations determined in block 304. In other examples, the process flow can include wellbore operations that are different from the actual wellbore operations determined in block 304. The process flow can include a sequential order of wellbore operations to perform at a target wellsite to form a wellbore at the target wellsite.

In some examples, the process-mining software can include a trained machine-learning model 213, such as a neural network or classifier. The trained machine-learning model 213 can be trained on historical data, such as event logs that relate to preexisting wells at various wellsites. The computing device 140 can provide, as input, the event log 214 to the trained machine-learning model 213 to determine the output process flow. For example, an input event log 214 can include an actual or historical wellbore operation that indicates a drilling state of the wellbore. Based on the actual or historical wellbore operation, the trained machine-learning model 213 can determine an expected wellbore operation to perform at a target wellsite. The trained machine-learning model 213 can also output other insights based on the drilling state, such as a context of the drilling state, location of a drill bit, and other suitable outputs. The computing device 140 can apply the trained machine-learning model 213 to each actual or historical wellbore operation of the combined event log to can generate the process flow. In some examples, the process flow can include a set of expected wellbore operations that can indicate improvements or other optimizations for forming the wellbore at the target wellsite 150.

At block 310, the computing device 140 outputs the process flow. The process flow can be output for viewing by an operator or other individual associated with a target wellsite. The operator can adjust the wellbore operations performed at the target wellsite based on the output process flow. For example, a previously-performed, actual wellbore operation may be removed from future wellbore operation processes. Additionally or alternatively, an order of the actual wellbore operations can be adjusted based on the output process flow.

In some examples, the computing device 140 can automatically adjust how wellbore operations are performed at the target wellsite in the future based on the output process flow. For example, the computing device 140 can adjust the weight-on-bit and the revolutions-per-minute parameters of a drilling operation based on the expected wellbore operations of the process flow output by the machine-learning model 213. The computing device 140 may automatically adjust the order or parameters of the wellbore operations by transmitting electronic communications to control systems associated with the wellbore operations.

Figure 4:
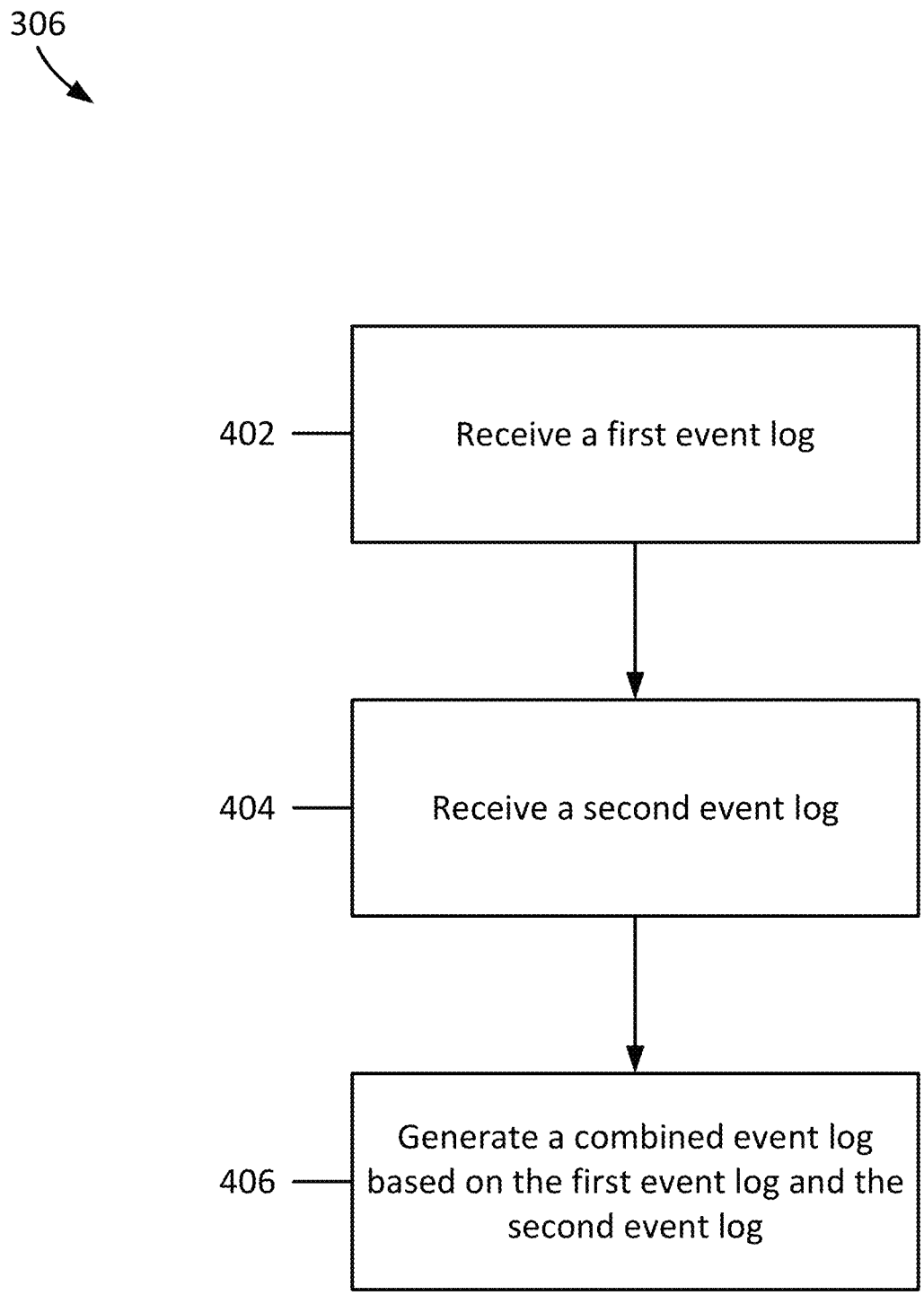
FIG. 4 shows a flow chart of a process to generate an event log according to some examples of the present disclosure.

FIG. 4 is a flow chart of a process 400 for generating an event log according to some examples of the present disclosure. In some examples, the steps of FIG. 4 are sub-steps of the block 306 of process 300 for generating the process flow. Other examples of flow charts may involve more steps, fewer steps, different steps, or a different combination of steps than is shown in FIG. 4. The below steps are described with reference to the components of FIGS. 1-2 described above.

At block 402, the computing device 140 receives a first event log. The first event log may indicate well operations performed at a target wellsite in some examples. Receiving the first event log may involve the computing device 140 generating the first event log. For example, the computing device 140 can apply the rules-based algorithm 212 to data received from the sensors 109 to determine actual wellbore operations performed at the target wellsite. The computing device 140 can then include the actual wellbore operations and associated timestamps in the first event log. The first event log can also include other suitable information about the actual wellbore operations.

At block 404, the computing device 140 receives a second event log. The second event log can include historical event data about other wellsites that are different from the target wellsite. The historical event data can indicate historical wellbore operations performed at the other wellsites in the past. In some examples, the computing device 140 can receive the historical event data from the other wellsites and generate the second event log based on the historical event data, for example by using the rules-based algorithm 212 or the machine-learning model 213. The second event log may be of a similar type to the first event log but contain different information than the first event log.

At block 406, the computing device 140 generates a combined event log based on the first event log and the second event log. The combined event log can include a combination of the actual wellbore operations described the first event log and the second event log. In some examples, a subset of the wellbore operations of the first event log and of the second event log can be similar or identical. In these examples, the subset can be repeated or can otherwise be populated more than once in the combined event log. The computing device 140 can concatenate the first event log and the second event log, or perform other suitable computing operations for combining the first event log and the second event log. The combined event log can then be provided as input to the process-mining software for generating and outputting the process flow.

Figure 5:
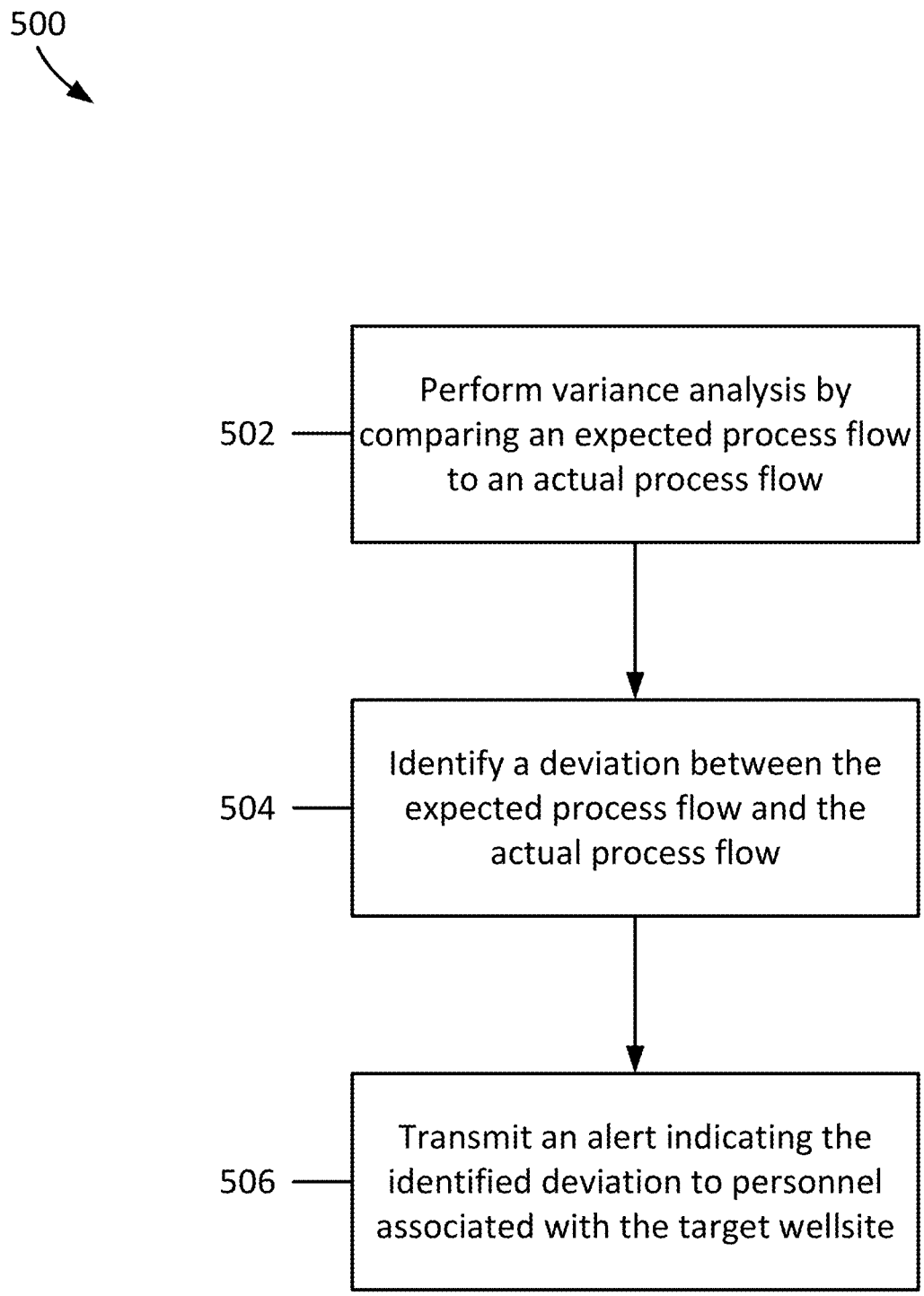
FIG. 5 shows a flow chart of a process to identify and report a deviation between an expected process flow and an actual process flow according to some examples of the present disclosure.

FIG. 5 is a flow chart of a process 500 to identify and report a deviation between an expected process flow and an actual process flow according to some examples of the present disclosure. Other examples of flow charts may involve more steps, fewer steps, different steps, or a different combination of steps than is shown in FIG. 5. The below steps are described with reference to the components of FIGS. 1-2 described above.

At block 502, the computing device 140 performs a variance analysis by comparing an expected process flow at a target wellsite 150 to an actual process flow performed at the target wellsite 150. The expected process flow can be the process flow generated by the computing device 140 via the process-mining software. The actual process flow performed at the target wellsite can be the actual wellbore operations performed at the target wellsite. The actual process flow can be determined by an operator of the target wellsite or another individual based on observations or event logs from the target wellsite.

In some examples, the computing device 140 can perform the variance analysis by comparing each expected wellbore operation of the expected process flow to each actual wellbore operation of the actual process flow. The variance analysis can indicate whether differences are present between the expected wellbore operations and the actual wellbore operations. One example of such a difference can be a deviation between the order of the expected wellbore operations and the order of the actual wellbore operations. In some examples, the computing device 140 can execute a predefined algorithm, which can be similar to the rules-based algorithm 212, to perform the variance analysis.

At block 504, the computing device 140 identifies a deviation between the expected process flow and the actual process flow. A deviation can be any difference between the expected process flow and the actual process flow. In some examples, the computing device 140 may only flag deviations of a sufficient magnitude between the expected process flow and the actual process flow. For example, the computing device 140 can compare a first set of parameter values for an expected wellbore operation to a second set of parameter values for an actual wellbore operation to determine if differences between the two sets of parameter values exist that exceed a predefined threshold value. In one such example, the threshold value can be a 10% deviation between a parameter value for the expected wellbore operation and another parameter value for the actual wellbore operation. If a difference between the two parameter values is greater than 10%, the computing device 140 may identify the difference as a deviation. Of course, the threshold of 10% is merely exemplary and the computing device 140 may apply other threshold values for identifying or otherwise determining the deviations. In other examples, the computing device 140 can identify the deviation by comparing an order of the expected wellbore operations to an order of the actual wellbore operations. The computing device 140 can identify the deviation using other suitable techniques.

At block 506, the computing device 140 transmits an alert indicating the identified deviation to personnel associated with the target wellsite. The computing device 140 can transmit the alert by displaying the alert using the input/output interface 232 using the display or other suitable component for displaying the alert. The alert may inform the personnel, which can include the operator or other individual associated with the target wellsite, that the deviations have been identified. In some examples, the alert may include an option that can be manually selected by a user to update the expected process flow based on the deviation or to resolve the deviation. Alternatively, the computing device 140 may automatically update the expected process flow based on the identified deviation. Either way, the expected process flow can be adjusted based on the identified deviation to improve an accuracy of the expected process flow. The accuracy of the expected process flow can indicate how closely the expected process flow follows the actual process flow or can indicate a level of optimization of the actual process flow.

Figure 6:
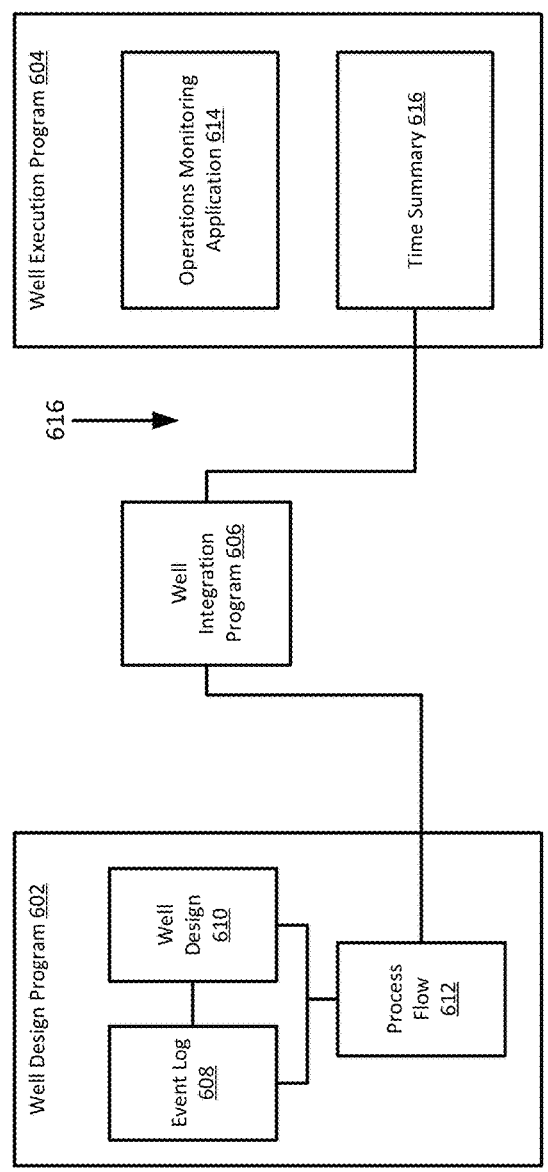
FIG. 6 shows a block diagram of a system of software applications for planning and forming a wellbore according to some examples of the present disclosure.

FIG. 6 is a block diagram of a system of applications 600 for planning and forming a wellbore at a target wellsite 150 according to some examples of the present disclosure. The applications 600 can be executed by a computing device, such as computing device 140 of FIG. 1. The applications 600 include a well design program 602, a well execution program 604, and a well integration program 606. The applications 600 may additionally or alternatively include other applications or programs for designing or forming the wellbore.

The well design program 602 can include an event log 608 and a well design 610. In some examples, the well design program 602 can generate the event log 608, which can include a set of actual wellbore operations for forming the wellbore 118. The well design program 602 can use the rules-based algorithm 212, the machine-learning model 213, or both of these for generating the event log 608 based on the actual wellbore operations.

In some examples, the well design program 602 can include or use the process-mining software to generate a process flow based on the event log 608. And, based on the generated process flow, the well design program 602 can generate the well design 610. The well design 610 can include a sequence of expected wellbore operations that can be used for forming a wellbore at a target wellsite 150. The well design 610 can additionally or alternatively be converted to a process flow 612 that can be transmitted to, or otherwise shared with, the well execution program 604.

The well design program 602 can transmit the process flow 612 to the well integration program 606, and the well integration program 606 can translate the process flow 612 into a format that is readable or executable by the well execution program 604.

The well execution program 604 can receive the translated process flow 612 and can execute the process flow 612 for forming the wellbore at the target wellsite 150. For example, the well execution program 604 can adjust parameters of actual wellbore operations performed to form the wellbore at the target wellsite 150 based on the process flow 612. This can involve executing the wellbore operations in the sequential order defined by the process flow 612. While executing the process flow 612, the well execution program 604 can monitor the actual wellbore operations using an operations monitoring application 614. The operations monitoring application 614 can track and record the actual wellbore operations.

Additionally or alternatively, the operations monitoring application 614 can generate and output a time summary 616 based on the actual wellbore operations. The time summary 616 can include documentation, such as timestamps, operation descriptions, and the like, relating to the actual wellbore operations. In some examples, the time summary 616 generated by the well execution program 604 can include, or can be combined with, an operator-generated time summary. The time summary 616 can be transmitted to the well integration program 606 for translating the time summary 616 into a format readable or executable by the well design program 602. The well design program 602 can receive the translated time summary 616 and can provide suggestions for improving the process flow 612 for optimizing the formation of the wellbore at the target wellsite 150.

Figure 7:
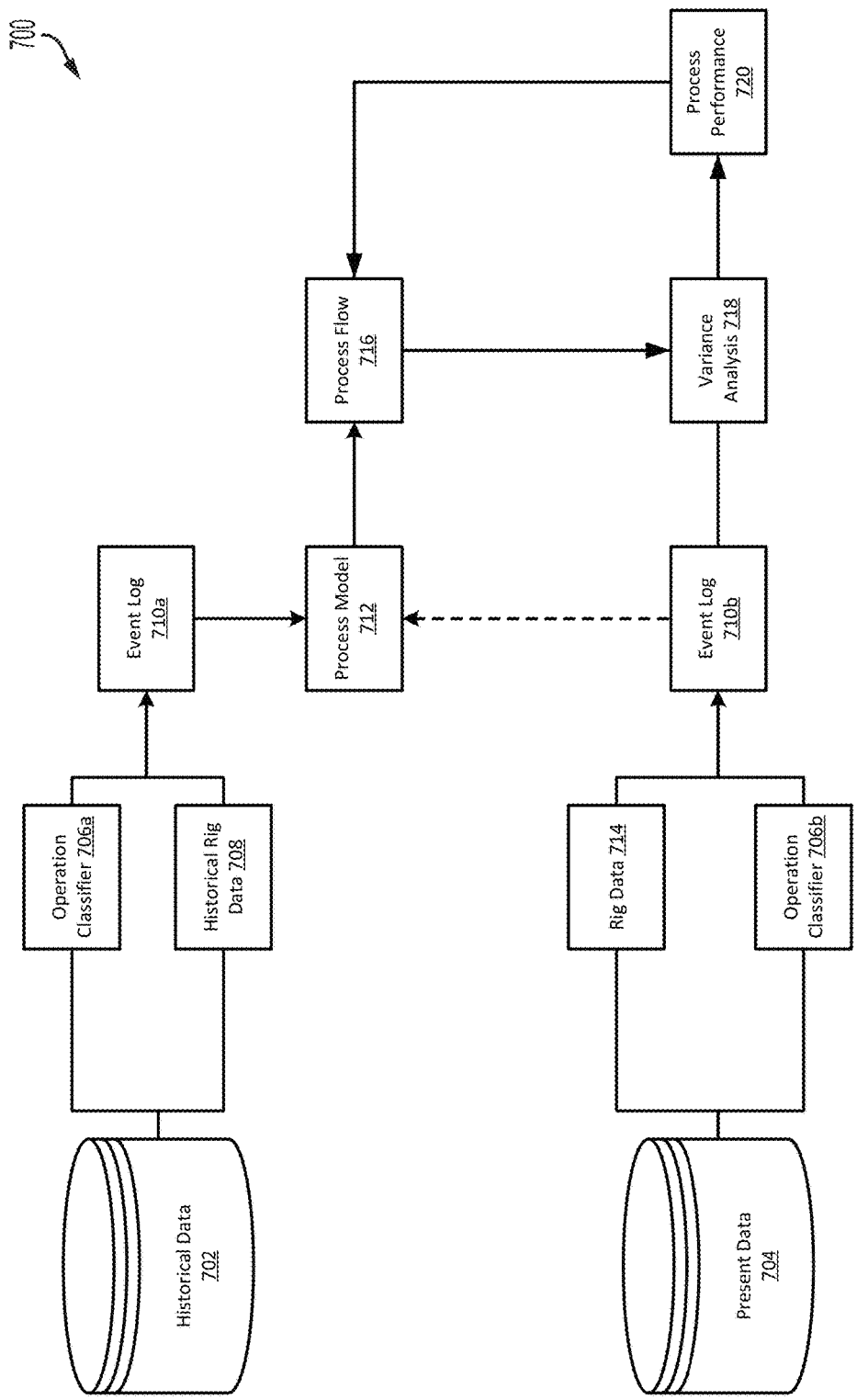
FIG. 7 shows a block diagram of a process for generating and improving a process flow according to some examples of the present disclosure.

FIG. 7 is a block diagram of a process 700 for generating and improving a process flow according to some examples of the present disclosure. In some examples, the computing device 140, or other suitable computing device or system, can perform operations of the process 700. The computing device 140 can access historical data 702 from preexisting, or offset, wells and can access present data 704 from a wellbore 118 that is being formed or is otherwise scheduled or planned to be formed at a target wellsite. The computing device 140 can use an operations classifier 706a, which can be similar or identical to the rules-based algorithm 212 or the machine-learning model 213, to classify or otherwise determine historical wellbore operations performed with respect to the preexisting wells. The computing device 140 can access or otherwise receive historical rig data 708 that can include a report, which can indicate reported or observed historical wellbore operations, from an operator or supervisor of the preexisting wells. The computing device 140 can use the operations classifier 706a and the historical rig data 708 to generate an event log 710a relating to the preexisting wells. The event log 710a can be used by the computing device 140 to generate a process model 712 that can represent or otherwise indicate a process for forming the wellbore 118.

The computing device 140 can additionally use the present data 704 to generate an event log 710b. For example, the computing device 140 can access rig data 714 relating to the wellbore being formed at the target wellsite 150. The rig data 714 can include data types similar or identical to the data types of the historical rig data 708 with respect to the preexisting wells. The computing device 140 can additionally access an operations classifier 706b, which can be similar or identical to the operations classifier 706a. The computing device 140 can use the operations classifier 706a to classify actual wellbore operations of the present data 704 and can use the classified present data 704, in combination with the rig data 714, to generate the event log 710b.

In some examples, the computing device 140 can combine the event logs 710a-b to form a combined event log, similar to the combined event log described with respect to block 404 of the process 400. The combined event log can be provided by the computing device 140 to the machine-learning model 213 for generating the process flow 716. The process flow 716 can be similar or identical to the process flow described with respect to the block 308 of the process 300 and can include a set of expected wellbore operations for forming the wellbore at the target wellsite 150.

After generating the process flow 716 based on the one or more event logs 710a-b, the computing device 140 can perform a variance analysis at block 718. The variance analysis can be similar or identical to the variance analysis performed at the block 502 of the process 500. The variance analysis can involve comparing the process flow 716 to the actual wellbore operations that are documented or otherwise performed for forming the wellbore. Additionally or alternatively, the variance analysis can apply a threshold value to a difference between the process flow 716 and the actual wellbore operations for determining one or more deviations between the process flow 716 and the actual wellbore operations with respect to the wellbore 118.

Next, the computing device 140 can execute a performance analysis. The performance analysis can involve determining whether the actual wellbore operations with respect to the wellbore 118 are optimized. For example, if the variance analysis performed at the block 718 identifies a deviation, the performance analysis can determine whether the deviation can improve the actual wellbore operations. For example, if the deviation reduced an amount of time to perform the actual wellbore operation, the computing device 140 can determine that the deviation is positive and improves the actual wellbore operations. In other examples, the deviation can extend the amount of time for completing the actual wellbore operations, which can be identified by the computing device 140 as a negative deviation. If the deviation can improve the actual wellbore operations, the computing device 140 can adjust the process flow 716 to include the deviation. If the deviation did not improve the actual wellbore operations, the computing device 140 can return an alert, similar to the block 506 of the process 500, to notify personnel of the target wellsite of the deviation. The computing device 140 can update the process flow 716 and can repeat the blocks 718 and 720 until no deviations are identified, until the wellbore is formed, or otherwise for a suitable amount of time.

In some aspects, systems, methods, and non-transitory computer-readable mediums for generating and outputting a process flow for forming a wellbore are provided according to one or more of the following examples.

In some aspects, systems, methods, and non-transitory computer-readable mediums for generating and outputting a process flow for forming a wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving data from a plurality of sensors positioned at a wellsite; based on the data, determining wellbore operations performed at the wellsite using one or more predefined algorithms; generating an event log based on the wellbore operations; executing process-mining software to generate a process flow based on the event log, the process-mining software including a machine-learning model configured to derive the process flow from the event log; and outputting the process flow for use in forming one or more wellbores.

Example 2 is the system of example 1, wherein the event log is a first event log, and wherein the operations further comprise: receiving a second event log that includes historical event data relating to one or more preexisting wells; generating a combined event log that includes the first event log and the second event log; and generating the process flow by supplying the combined event log as input to the machine-learning model.

Example 3 is the system of any of examples 1-2, wherein the operations further comprise adjusting the process flow based on an identified deviation to improve an accuracy of the process flow.

Example 4 is the system of any of examples 1-3, wherein the operations further comprise: performing a variance analysis by comparing the process flow to one or more operations performed at the one or more wellsites; identifying a deviation between the process flow and the one or more operations performed at the one or more wellsites; and transmitting an alert to personnel associated with the one or more wellsites in response to identifying the deviation for enabling the deviation to be resolved.

Example 5 is the system of any of examples 1-4, wherein the operations further comprise training the machine-learning model using event log data associated with one or more wells.

Example 6 is the system of any of examples 1-5, wherein the operations further comprise, prior to using the process-mining software to derive the process flow from the event log: receiving reporting data that describes one or more wellbore operations observed or recorded by personnel of the wellsite; and generating the event log based on the reporting data.

Example 7 is the system of any of examples 1-6, wherein the one or more predefined algorithms includes a trained machine-learning model.

Example 8 is the system of any of examples 1-7, wherein the plurality of sensors includes a weight-on-bit sensor, a rotations-per-minute sensor, a pressure sensor, and a rate of penetration sensor.

Example 9 is a method comprising: receiving, by a computing device, data from a plurality of sensors positioned at a wellsite; based on the data, determining, by the computing device, wellbore operations performed at the wellsite using one or more predefined algorithms; generating, by the computing device, an event log based on the wellbore operations; executing, by the computing device, process-mining software to generate a process flow based on the event log, the process-mining software including a machine-learning model configured to derive the process flow from the event log; and outputting, by the computing device, the process flow for use in forming one or more wellbores.

Example 10 is the method of example 9, wherein the event log is a first event log, further comprising: receiving a second event log that includes historical event data relating to one or more preexisting wells; generating a combined event log that includes the first event log and the second event log; and generating the process flow by supplying the combined event log as input to the machine-learning model.

Example 11 is the method of any of examples 9-10, further comprising adjusting the process flow based on an identified deviation to improve an accuracy of the process flow.

Example 12 is the method of any of examples 9-11, further comprising: performing a variance analysis by comparing the process flow to one or more operations performed at the one or more wellsites; identifying a deviation between the process flow and the one or more operations performed at the one or more wellsites; and transmitting an alert to personnel associated with the one or more wellsites in response to identifying the deviation for enabling the deviation to be resolved.

Example 13 is the method of any of examples 9-12, further comprising, prior to using the process-mining software to derive the process flow from the event log: receiving reporting data that describes one or more wellbore operations observed or recorded by personnel of the wellsite; and generating the event log based on the reporting data.

Example 14 is the method of any of examples 9-13, wherein the one or more predefined algorithms includes a trained machine-learning model.

Example 15 is the method of any of examples 9-14, wherein the plurality of sensors includes a weight-on-bit sensor, a rotations-per-minute sensor, a pressure sensor, and a rate of penetration sensor.

Example 16 is a non-transitory computer-readable medium comprising instructions that are executable by a processing device for causing the processing device to perform operations comprising: receiving data from a plurality of sensors positioned at a wellsite; based on the data, determining wellbore operations performed at the wellsite using one or more predefined algorithms; generating an event log based on the wellbore operations; executing process-mining software to generate a process flow based on the event log, the process-mining software including a machine-learning model configured to derive the process flow from the event log; and outputting the process flow for use in forming one or more wellbores.

Example 17 is the non-transitory computer-readable medium of example 16, wherein the event log is a first event log, and wherein the operations further comprise: receiving a second event log that includes historical event data relating to one or more preexisting wells; generating a combined event log that includes the first event log and the second event log; and generating the process flow by supplying the combined event log as input to the machine-learning model.

Example 18 is the non-transitory computer-readable medium of any of examples 16-17, wherein the operations further comprise adjusting the process flow based on an identified deviation to improve an accuracy of the process flow.

Example 19 is the non-transitory computer-readable medium of any of examples 16-18, wherein the operations further comprise: performing a variance analysis by comparing the process flow to one or more operations performed at the one or more wellsites; identifying a deviation between the process flow and the one or more operations performed at the one or more wellsites; and transmitting an alert to personnel associated with the one or more wellsites in response to identifying the deviation for enabling the deviation to be resolved.

Example 20 is the non-transitory computer-readable medium of examples 16-19, wherein the one or more predefined algorithms includes a trained machine-learning model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a non-transitory computer-readable medium comprising instructions that are executable by the processor to cause the processor to perform operations comprising:
   receiving data from a plurality of sensors positioned at a wellsite;
   based on the data, determining wellbore operations performed at the wellsite using one or more predefined algorithms;
   generating an event log based on the wellbore operations;
   executing process-mining software to generate a process flow based on the event log, the process-mining software including a machine-learning model configured to derive the process flow from the event log; and
   outputting the process flow for use in forming one or more wellbores.

2. The system of claim 1, wherein the event log is a first event log, and wherein the operations further comprise:
   receiving a second event log that includes historical event data relating to one or more preexisting wells;
   generating a combined event log that includes the first event log and the second event log; and
   generating the process flow by supplying the combined event log as input to the machine-learning model.

3. The system of claim 2, wherein the operations further comprise adjusting the process flow based on an identified deviation to improve an accuracy of the process flow.

4. The system of claim 1, wherein the operations further comprise:
   performing a variance analysis by comparing the process flow to one or more operations performed at the one or more wellsites;
   identifying a deviation between the process flow and the one or more operations performed at the one or more wellsites; and
   transmitting an alert to personnel associated with the one or more wellsites in response to identifying the deviation for enabling the deviation to be resolved.

5. The system of claim 1, wherein the operations further comprise training the machine-learning model using event log data associated with one or more wells.

6. The system of claim 1, wherein the operations further comprise, prior to using the process-mining software to derive the process flow from the event log:
   receiving reporting data that describes one or more wellbore operations observed or recorded by personnel of the wellsite; and
   generating the event log based on the reporting data.

7. The system of claim 1, wherein the one or more predefined algorithms includes a trained machine-learning model.

8. The system of claim 1, wherein the plurality of sensors includes a weight-on-bit sensor, a rotations-per-minute sensor, a pressure sensor, and a rate of penetration sensor.

9. A method comprising:
   receiving, by a computing device, data from a plurality of sensors positioned at a wellsite;
   based on the data, determining, by the computing device, wellbore operations performed at the wellsite using one or more predefined algorithms;
   generating, by the computing device, an event log based on the wellbore operations;
   executing, by the computing device, process-mining software to generate a process flow based on the event log, the process-mining software including a machine-learning model configured to derive the process flow from the event log; and
   outputting, by the computing device, the process flow for use in forming one or more wellbores.

10. The method of claim 9, wherein the event log is a first event log, further comprising:
    receiving a second event log that includes historical event data relating to one or more preexisting wells;
    generating a combined event log that includes the first event log and the second event log; and
    generating the process flow by supplying the combined event log as input to the machine-learning model.

11. The method of claim 10, further comprising adjusting the process flow based on an identified deviation to improve an accuracy of the process flow.

12. The method of claim 9, further comprising:
    performing a variance analysis by comparing the process flow to one or more operations performed at the one or more wellsites;
    identifying a deviation between the process flow and the one or more operations performed at the one or more wellsites; and
    transmitting an alert to personnel associated with the one or more wellsites in response to identifying the deviation for enabling the deviation to be resolved.

13. The method of claim 9, further comprising, prior to using the process-mining software to derive the process flow from the event log:
    receiving reporting data that describes one or more wellbore operations observed or recorded by personnel of the wellsite; and
    generating the event log based on the reporting data.

14. The method of claim 9, wherein the one or more predefined algorithms includes a trained machine-learning model.

15. The method of claim 9, wherein the plurality of sensors includes a weight-on-bit sensor, a rotations-per-minute sensor, a pressure sensor, and a rate of penetration sensor.

16. A non-transitory computer-readable medium comprising instructions that are executable by a processing device for causing the processing device to perform operations comprising:
    receiving data from a plurality of sensors positioned at a wellsite;

based on the data, determining wellbore operations performed at the wellsite using one or more predefined algorithms;

generating an event log based on the wellbore operations;

executing process-mining software to generate a process flow based on the event log, the process-mining software including a machine-learning model configured to derive the process flow from the event log; and outputting the process flow for use in forming one or more wellbores.

17. The non-transitory computer-readable medium of claim 16, wherein the event log is a first event log, and wherein the operations further comprise:

receiving a second event log that includes historical event data relating to one or more preexisting wells;

generating a combined event log that includes the first event log and the second event log; and generating the process flow by supplying the combined event log as input to the machine-learning model.

18. The non-transitory computer-readable medium of claim 17, wherein the operations further comprise adjusting the process flow based on an identified deviation to improve an accuracy of the process flow.

19. The non-transitory computer-readable medium of claim 16, wherein the operations further comprise:

performing a variance analysis by comparing the process flow to one or more operations performed at the one or more wellsites;

identifying a deviation between the process flow and the one or more operations performed at the one or more wellsites; and transmitting an alert to personnel associated with the one or more wellsites in response to identifying the deviation for enabling the deviation to be resolved.

20. The non-transitory computer-readable medium of claim 16, wherein the one or more predefined algorithms includes a trained machine-learning model.

* * * * *